United States Patent
Andreas-Schott et al.

(10) Patent No.: US 8,323,851 B2
(45) Date of Patent: Dec. 4, 2012

(54) NON-PERMEABLE LOW CONTACT RESISTANCE SHIM FOR COMPOSITE FUEL CELL STACKS

(75) Inventors: Benno Andreas-Schott, Pittsford, NY (US); Roger M. Brisbane, Spencerport, NY (US); Mahmoud H. Abd Elhamid, Grosse Pointe Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1884 days.

(21) Appl. No.: 11/434,386

(22) Filed: May 15, 2006

(65) Prior Publication Data

US 2007/0264556 A1  Nov. 15, 2007

(51) Int. Cl.
   - H01M 2/38 (2006.01)
   - H01M 2/40 (2006.01)
   - H01M 8/24 (2006.01)
   - H01M 8/04 (2006.01)
   - H01M 4/64 (2006.01)

(52) U.S. Cl. ........ 429/512; 429/456; 429/460; 429/517; 429/521; 429/522

(58) Field of Classification Search ............ 429/34, 429/456, 460, 512, 517, 521, 522
See application file for complete search history.

(56) References Cited

U.S. PATENT DOCUMENTS

| | | | |
|---|---|---|---|
| 6,790,554 B2 * | 9/2004 | May et al. | 429/34 |
| 2005/0100771 A1 * | 5/2005 | Vyas et al. | 429/32 |
| 2005/0260479 A1 * | 11/2005 | Raiser et al. | 429/34 |

FOREIGN PATENT DOCUMENTS

| | | | |
|---|---|---|---|
| JP | 58-161272 A | | 9/1983 |
| JP | 58-194262 A | | 11/1983 |
| JP | 2005-293874 A | | 10/2005 |

OTHER PUBLICATIONS

Huang et al., Development of fuel cell bipolar plates from graphite filled wet-lay thermoplastic composite materials, May 24, 2005, Journal of Power Sources, 150, p. 110-119.*

* cited by examiner

*Primary Examiner* — Eugenia Wang
(74) *Attorney, Agent, or Firm* — John A. Miller; Miller IP Group, PLC

(57) ABSTRACT

A fuel cell stack that includes a non-permeable shim plate positioned between a composite unipolar plate and a terminal plate at both ends of the stack, where the shim plate is made of a non-corrosive material, such as stainless steel, titanium or sealed graphite. Because the shim plate is non-permeable, it prevents cooling fluid that diffuses through the unipolar plate from contacting the terminal plate, which would otherwise corrode the terminal plate. The shim plate can be coated with a conductive material, such as gold, platinum, ruthenium oxide or mixtures thereof, to reduce its contact resistance.

25 Claims, 1 Drawing Sheet

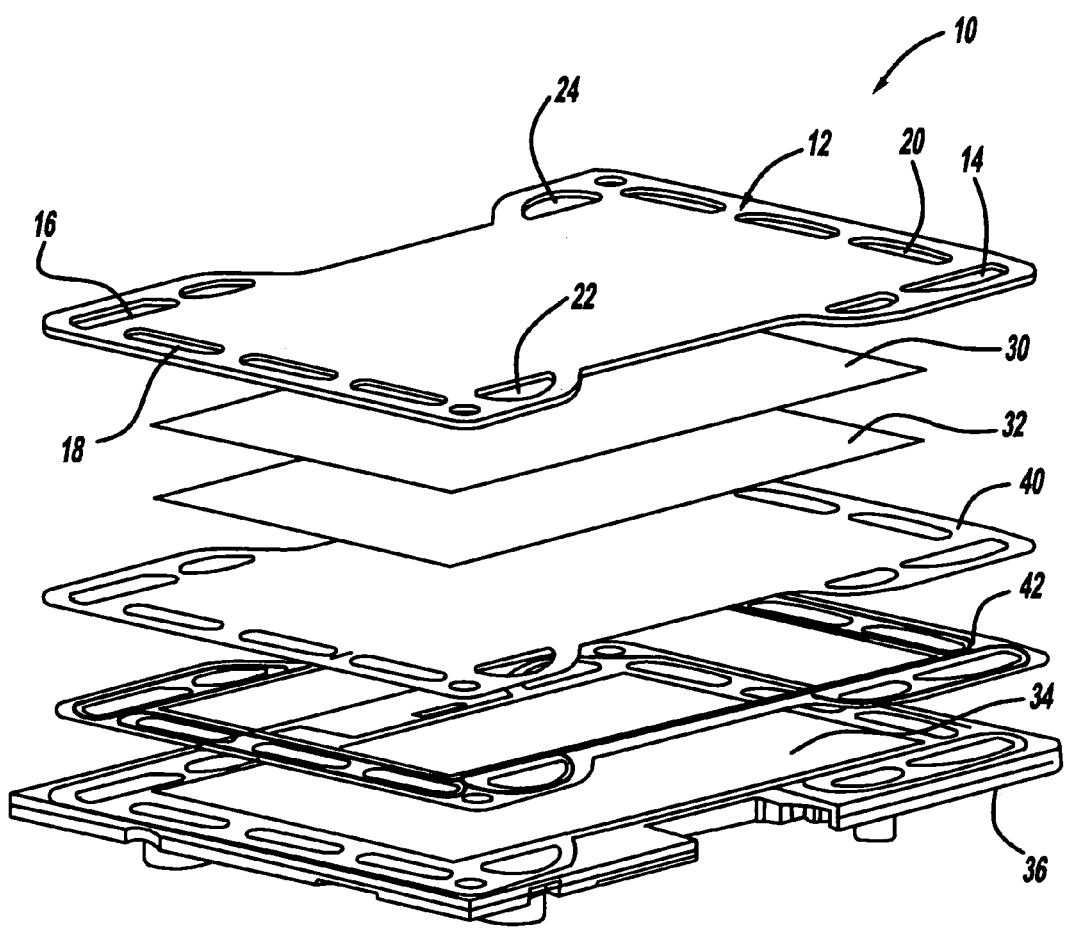

NON-PERMEABLE LOW CONTACT RESISTANCE SHIM FOR COMPOSITE FUEL CELL STACKS

BACKGROUND OF THE INVENTION

1. Field of the Invention

This invention relates generally to a fuel cell stack and, more particularly, to a fuel cell stack that includes a non-permeable, low contact resistance shim plate at both ends of the stack for preventing cooling fluid that permeates through a composite unipolar plate from corroding a terminal plate at the ends of the stack.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. The bipolar plates are made of a conductive material, such as stainless steel, so that they conduct the electricity generated by the fuel cells out of the stack.

The bipolar plates also include flow channels through which a cooling fluid flows. In one known fuel cell stack design, the bipolar plates are composite bipolar plates, such as ester based compression molded plates, that absorb the cooling fluid, causing it to leak into adjacent flow fields.

Unipolar plates are provided at both ends of the fuel cell stack where the unipolar plate includes the flow channels at a cathode side or anode side of the last fuel cell in the stack. A terminal plate is positioned at an opposite side of the unipolar plate from the stack of fuel cells, and acts as a current collector for the current generated by the stack. In certain designs, the terminal plate is a copper plate that is coated with nickel or tin. An insulator plate is positioned at the end of the stack adjacent to the terminal plate. For those stack plates made of a composite material, the cooling fluid flowing through the flow channels in the unipolar plate leaks through the unipolar plate and collects in the cavity between the unipolar plate and the insulator plate where the terminal plate is located. The cooling fluid corrodes the coating on the terminal plate making it less conductive, which in turn leads to a significant loss in stack performance.

SUMMARY OF THE INVENTION

In accordance with the teachings of the present invention, a fuel cell stack is disclosed that includes a non-permeable shim plate positioned between a composite unipolar plate and a terminal plate at both ends of the stack, where the shim plate is made of a non-corrosive material, such as stainless steel. Because the shim plate is non-permeable, it prevents cooling fluid that diffuses through the unipolar plate from contacting the terminal plate, which would otherwise corrode the terminal plate. The shim plate can be coated with a conductive material, such as gold, to reduce its contact resistance with the composite plate.

Additional features of the present invention will become apparent from the following description and appended claims, taken in conjunction with the accompanying drawings.

BRIEF DESCRIPTION OF THE DRAWING

FIG. 1 is a blown-apart perspective view of an end section of a fuel cell stack including a non-permeable, low contact resistance shim plate, according to an embodiment of the present invention.

DETAILED DESCRIPTION OF THE EMBODIMENTS

The following discussion of the embodiments of the invention directed to a fuel cell stack including a non-permeable, low contact resistance shim plate that prevents terminal plate corrosion is merely exemplary in nature, and is in no way intended to limit the invention for its application or uses.

FIG. 1 is a blown-apart perspective view of an end section of a fuel cell stack 10. As discussed above, a fuel cell stack includes a repeating series of fuel cells including bipolar plates having anode sides and cathode sides for adjacent fuel cells in the stack 10. The bipolar plates are not shown in FIG. 1. At the ends of the stack 10, a composite unipolar plate 12 is provided that includes the flow channels (not shown) for either the cathode side or the anode side of the last fuel cell in the stack 10. A composite unipolar plate typically includes two molded halves that are glued together. The two halves define parallel cooling fluid flow channels running through the center of the plate. In the stack 10, cooling fluid will flow from opening 14 through the cooling fluid channels in the plate 12 and out of opening 16. Openings 18 and 20 are for a cathode reactant gas flow and openings 22 and 24 are for an anode reactant gas flow.

The unipolar plate 12 includes a molded gasket (not shown) formed to a bottom surface of the plate 12. Two diffusion media layers 30 and 32 are typically provided adjacent to the unipolar plate 12, opposite to the bipolar plates, to provide for electron transport. A conductive terminal plate 34 is provided to collect the electricity generated by the stack 10, and is typically a copper plate coated with nickel or tin. The terminal plate 34 is positioned within a cavity defined by an insulator plate 36 that provides electrical insulation at the ends of the stack 10. A structural base plate (not shown) would then be attached to the insulator plate 36 by bolts or the like to provide the end structure of the stack 10.

As discussed above, cooling fluid will permeate through the composite plate material. In the known composite plate designs, the cooling fluid would diffuse through the diffusion media layers 30 and 32 and collect in the cavity around the terminal plate 34, causing it to corrode. According to the invention, a non-permeable, low contact resistance shim plate 40 is provided between the diffusion media layer 32 and the terminal plate 34. The shim plate 40 has the same configuration as the unipolar plate 12, and is sealed against the molded gasket on the bottom surface of the plate 12. A molded gasket carrier 42 including a gasket, also having the same outer configuration as the shim plate 40, is provided between the shim plate 40 and the insulator plate 36. Therefore, when the fuel cell stack 10 is assembled, the shim plate 40 is sealed to the underside of the unipolar plate 12, and any cooling fluid that permeates through the unipolar plate 12 towards the terminal plate 34 is collected in the cavity between the plate 12 and the shim plate 40, and is absorbed by the diffusion media layers 30 and 32. Further, the shim plate 40 is sealed to the insulator plate 36 by the gasket carrier 42, and thus the cooling fluid is prevented from contacting the terminal plate 34.

The shim plate 40 can be made of any suitable material that does not corrode. In one embodiment, the shim plate 40 is stainless steel or a stainless steel alloy that does not permeate gases or liquids. Suitable alloys include C-276, CARP20, C-625, alloy 22, G-35, G-30, 904 L stainless steel, titanium and its alloys. These corrosion resistant materials have a passive oxide film on their surface that creates a high contact resistance with the gas diffusion medium and the composite plate material. Therefore, the shim plate 40 can be coated with a thin layer of an electrically conductive material, such as gold, platinum, ruthenium oxide or mixtures thereof. Any suitable deposition process can be used, such as plasma vapor deposition (PVD), to deposit the conductive coating on the plate 40 to any suitable thickness, such as 10 nm. Further, the shim plate 40 can be cladded at the surface facing the terminal plate 34, which could eliminate the need for the terminal plate 34 to be coated with nickel or tin.

According to another embodiment of the invention, the diffusion media layers 30 and 32 are also coated with a thin layer of a conductive material, such as gold, to further reduce the contact resistance of the end assembly of the stack 10. Any suitable process can be used to deposit the conductive layer on the diffusion media layers 30 and 32, such as PVD, to any suitable thickness.

In an alternate embodiment, the shim plate 40 is made of a sealed graphite material, such as Poco Graphite, available from the Poco Corporation, that is both non-permeable and highly electrically conductive. In this embodiment, the sealed graphite shim plate would not need to be coated with an outer conductive layer. In another embodiment, a Grafoil™ layer is positioned between the composite plate and the graphite shim plate so as to maintain a good pressure distribution on the composite plate and to avoid breaking the sealed graphite plate when pressure is applied to it.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell stack comprising:
    a unipolar plate positioned at both ends of the stack;
    a non-permeable shim plate positioned adjacent to each unipolar plate, wherein the shim plate includes an outer layer of an electrically conductive material; and
    a terminal plate positioned adjacent to each shim plate and opposite to the unipolar plate, said non-permeable shim plate being sealed to the unipolar plate so that cooling fluid that may permeate through the unipolar plate is trapped between the unipolar plate and the shim plate.

2. The stack according to claim 1 wherein the unipolar plate is a composite plate.

3. The stack according to claim 1 wherein the shim plate is a stainless steel or stainless steel alloy shim plate.

4. The stack according to claim 1 wherein the shim plate is a titanium or titanium alloy shim plate.

5. The stack according to claim 1 wherein the outer conductive layer is selected from the group consisting of a gold layer, a ruthenium oxide layer, a platinum layer and mixtures thereof.

6. The stack according to claim 1 wherein the outer conductive layer is about 10 nm thick.

7. The stack according to claim 1 wherein the shim plate is a sealed graphite shim plate.

8. The stack according to claim 1 wherein the shim plate is cladded at the side facing the terminal plate.

9. The stack according to claim 1 further comprising at least one diffusion media layer positioned between the unipolar plate and the shim plate.

10. The stack according to claim 9 wherein the at least one diffusion media layer includes an outer coating of an electrically conductive material.

11. The stack according to claim 1 wherein the stack is part of a fuel cell system on a vehicle.

12. A fuel cell stack comprising:
    a composite unipolar plate positioned at both ends of the stack;
    at least one diffusion media layer positioned adjacent to each unipolar plate;
    a stainless steel or stainless steel alloy shim plate positioned adjacent to the at least one diffusion media layer and opposite to the unipolar plate, said shim plate including an outer conductive layer; and
    a terminal plate positioned adjacent to the shim plate and opposite to the unipolar plate, said shim plate being sealed to the unipolar plate so that cooling fluid that may permeate through the unipolar plate is trapped between the unipolar plate and the shim plate.

13. The stack according to claim 12 wherein the outer conductive layer is selected from the group consisting of a gold layer, a ruthenium oxide layer, a platinum layer and mixtures thereof.

14. The stack according to claim 12 wherein the outer conductive layer has a thickness of about 10 nm.

15. The stack according to claim 12 wherein the at least one diffusion media layer includes an outer coating of an electrically conductive material.

16. The stack according to claim 12 wherein the shim plate is cladded at the side facing the terminal plate.

17. A fuel cell stack comprising:
    a composite unipolar plate positioned at both ends of the stack;

at least one diffusion media layer positioned adjacent to the unipolar plate;

a sealed graphite shim plate positioned adjacent to at least one diffusion media layer and opposite to the unipolar plate; and a terminal plate positioned adjacent to the shim plate and opposite to the unipolar plate, said shim plate being sealed to the unipolar plate so that cooling fluid that may permeate through the unipolar plate is trapped between the unipolar plate and the shim plate.

18. The stack according to claim 17 wherein at least one diffusion media layer includes an outer coating of an electrically conductive material.

19. The stack according to claim 17 wherein the shim plate is cladded at the side facing the terminal plate.

20. A fuel cell stack comprising:

a composite unipolar plate positioned at both ends of the stack;

at least one diffusion media layer positioned adjacent to each unipolar plate;

a titanium or titanium alloy shim plate positioned adjacent to the at least one diffusion media layer and opposite to the unipolar plate, said shim plate including an outer conductive layer; and a terminal plate positioned adjacent to the shim plate and opposite to the unipolar plate, said shim plate being sealed to the unipolar plate so that cooling fluid that may permeate through the unipolar plate is trapped between the unipolar plate and the shim plate.

21. The stack according to claim 20 wherein the outer conductive layer is selected from the group consisting of a gold layer, a ruthenium oxide layer, a platinum layer and mixtures thereof.

22. The stack according to claim 20 wherein the outer conductive layer has a thickness of about 10 nm.

23. The stack according to claim 20 wherein the at least one diffusion media layer includes an outer coating of an electrically conductive material.

24. A fuel cell stack comprising:

a unipolar plate positioned at both ends of the stack;

a non-permeable shim plate positioned adjacent to each unipolar plate, wherein the shim plate is a sealed graphite shim plate; and a terminal plate positioned adjacent to each shim plate and opposite to the unipolar plate, said non-permeable shim plate being sealed to the unipolar plate so that cooling fluid that may permeate through the unipolar plate is trapped between the unipolar plate and the shim plate.

25. A fuel cell stack comprising:

a unipolar plate positioned at both ends of the stack;

a non-permeable shim plate positioned adjacent to each unipolar plate, wherein the shim plate is cladded at the side facing the terminal plate; and a terminal plate positioned adjacent to each shim plate and opposite to the unipolar plate, said non-permeable shim plate being sealed to the unipolar plate so that cooling fluid that may permeate through the unipolar plate is trapped between the unipolar plate and the shim plate.

* * * * *